Figure 1:
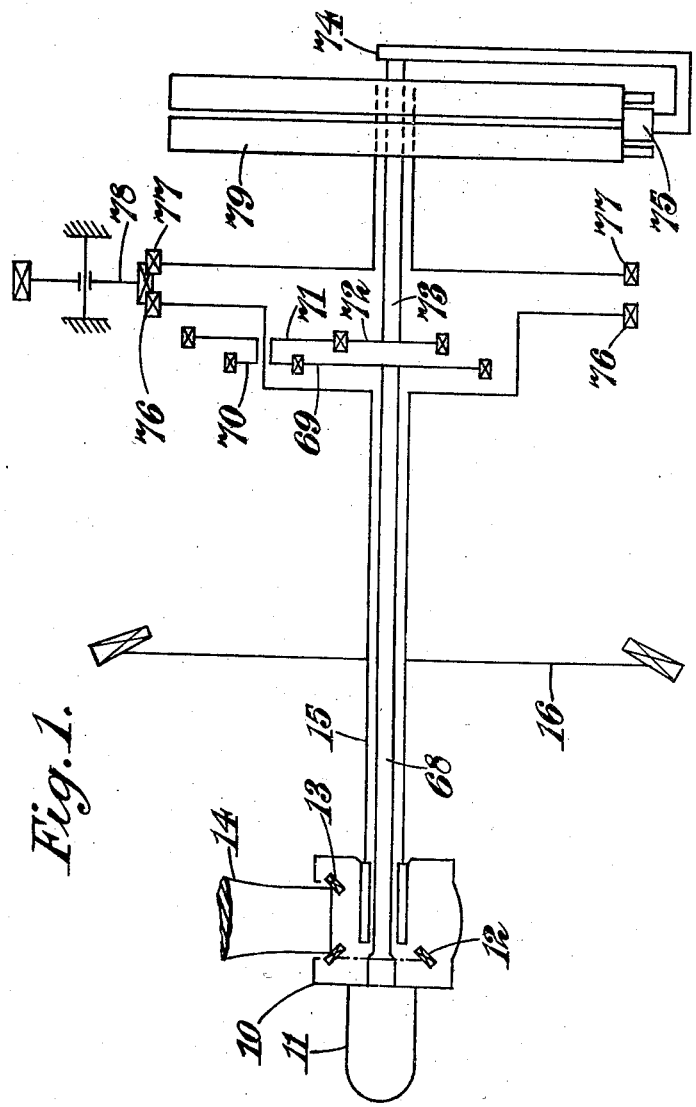

Nov. 13, 1945.    F. M. THOMAS ET AL    2,388,718
AIRSCREWS
Filed March 16, 1942    5 Sheets-Sheet 3

Inventors
F. M. Thomas
and P. R. Price
by Wilkinson & Mawhinney
Attorneys.

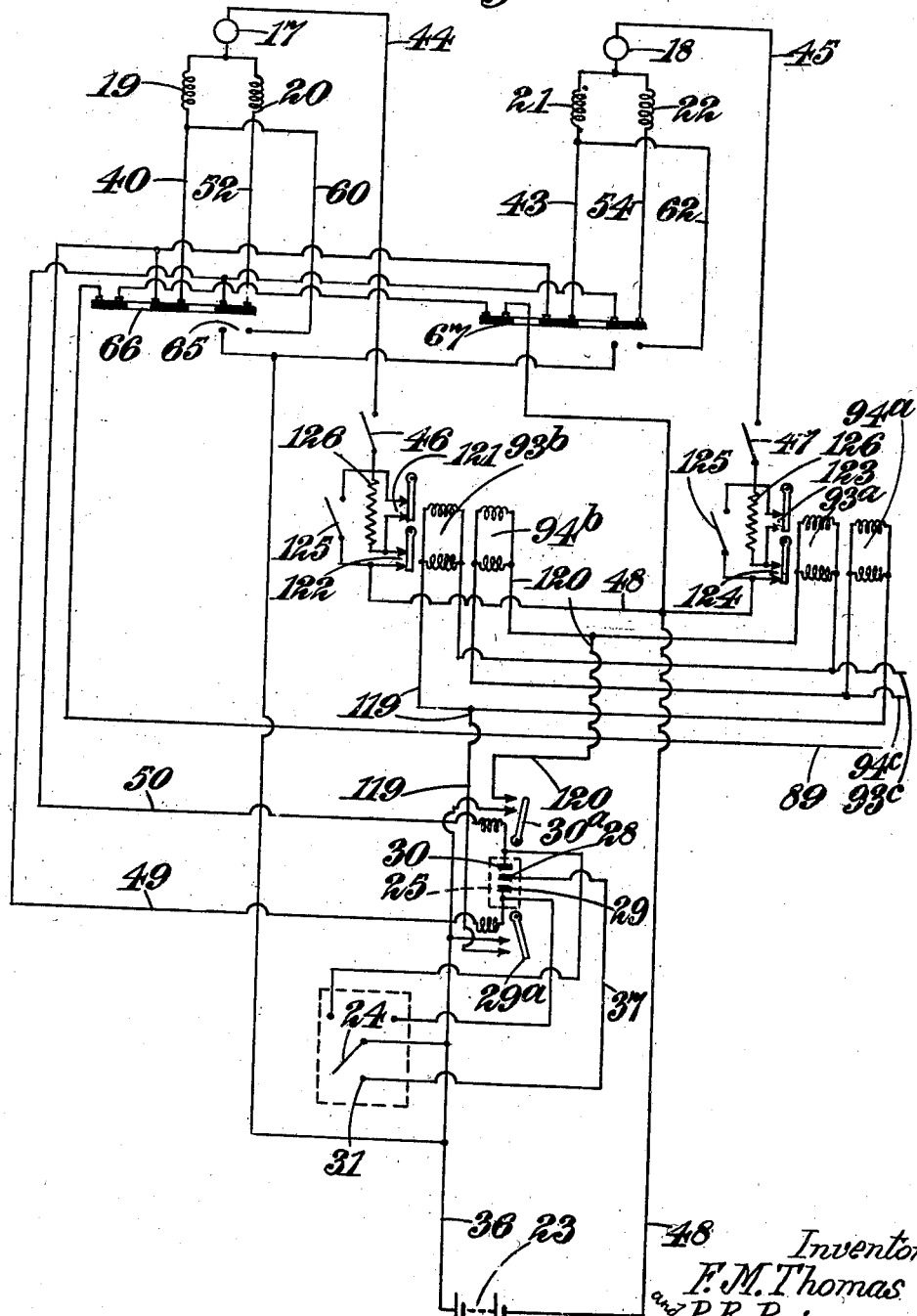

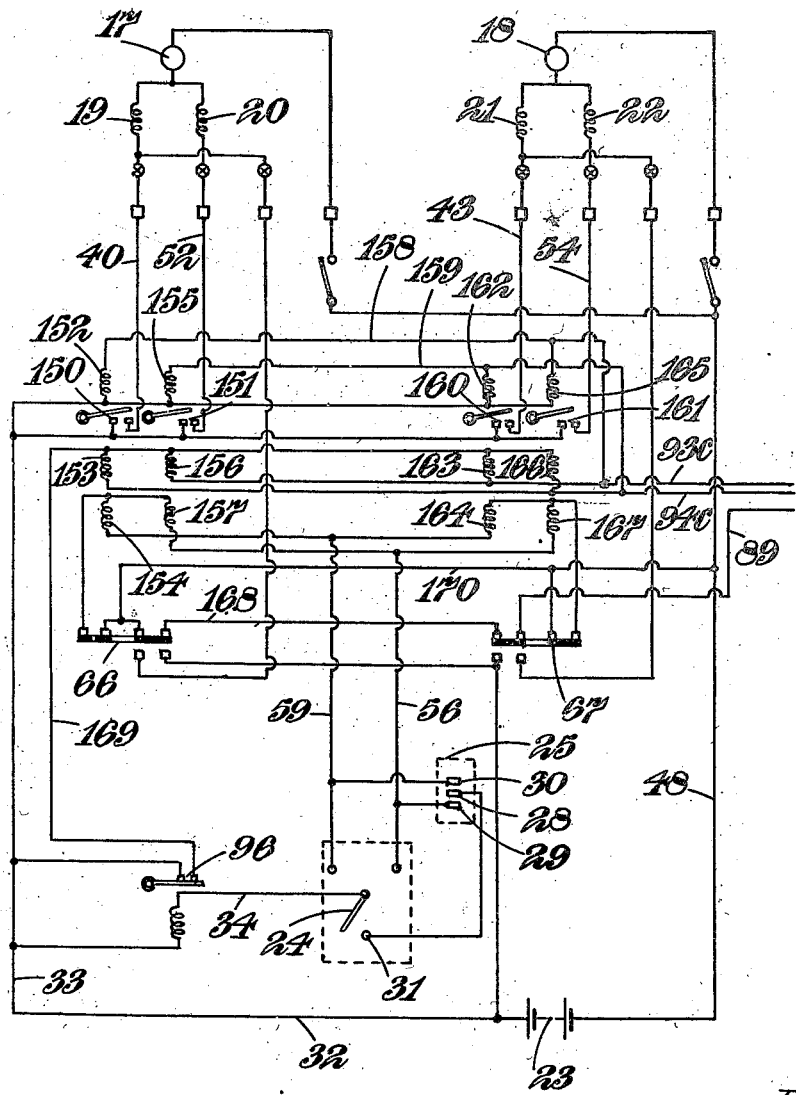

Patented Nov. 13, 1945

2,388,718

UNITED STATES PATENT OFFICE 2,388,718

AIRSCREW

Frederick Metcalf Thomas, North Adams, Mass., and Peter Ralph Price, Bristol, England, assignors to The Bristol Aeroplane Company Limited, Bristol, England, a British company Application March 16, 1942, Serial No. 434,976
In Great Britain April 30, 1941

9 Claims. (Cl. 170—135.6)

The present invention is concerned with airscrews as used on aircraft installations in which a plurality of airscrews are interconnected and are driven by one or more power-plants.

Two of the requirements to be met by the installations to which the present invention refers are that each airscrew shall rotate at a substantially constant pre-selected speed and that the power absorbed by each airscrew shall be controllable. Towards these ends constant-speed variable-pitch airscrews are used.

In certain of the installations referred to, the aerodynamic efficiency of the airscrew system may be increased if the power absorbed by any one airscrew bears a certain predetermined relationship to the power absorbed by any other airscrew. Thus the power absorbed by one of the airscrews may differ from that absorbed by another over the whole range of pitch-variation, or it may be equal at an intermediate or at the final position of adjustment. Instances of installations in which the efficiency may be so increased are those having tandem airscrews (one a tractor, the other a pusher) driven by a power plant disposed between the airscrews, or installations having co-axial contra-rotating airscrews driven by the same power plant.

In other installations the predetermined relationship is that the airscrews shall absorb the same power or in other words develop the same thrust. For example, in installations comprising two airscrews mounted one on each wing and driven from a single power plant, if the two airscrews do not develop equal thrusts they will be operating below the maximum efficiency.

It is an object of the present invention to provide a novel controlling means for airscrews whereby the power absorbed by the individual airscrews will satisfy the requirements of the particular installation.

According to the present invention there is provided the combination with a plurality of variable-pitch airscrews which are interconnected and are driven by one or more power plants so as to rotate in a preselected speed relationship, of means adapted to establish and/or maintain throughout the range of pitch-variations a predetermined relationship between the pitches of the airscrews, and hence between the powers absorbed by the airscrews. For brevity this operation will be referred to as "pitch-correction."

The pitch-correction mechanism may be combined with governor-controlled pitch-varying means which is used to maintain the speed of the power-plant at a predetermined value, commonly known as a "constant-speed control," and it may in alternative forms be arranged to be operative either whilst the constant-speed control is operative, or in the intervals in which it is inoperative.

According to another feature of the invention, the pitch-correction may be effected by simultaneous adjustment towards a mean value, or alternatively, it may be effected, during a constant-speed control operation by slowing or stopping the appropriate pitch-changing motor.

According to yet another feature of the invention, means may be provided for overriding any of the controls and enabling feathering of an airscrew to be effected at any time.

According to another feature of this invention there is provided the combination with two or more variable-pitch airscrews, of means for detecting any change in the pitch of one airscrew relatively to another, comprising for each airscrew, an electric switch-device that is opened and closed periodically, means interconnecting each switch with the blades of its airscrew so that the datum-timing of its operating cycle is determined by the pitch-setting of the blades, said means being so arranged that when the pitches of the airscrews are equal their switches are operated in opposite phase, but on an alteration of the datum-timing, the closed periods of two switches overlap, said switches being arranged in a circuit which includes an indicating or controlling device for the pitch-adjustment of one or both airscrews.

Figure 2:
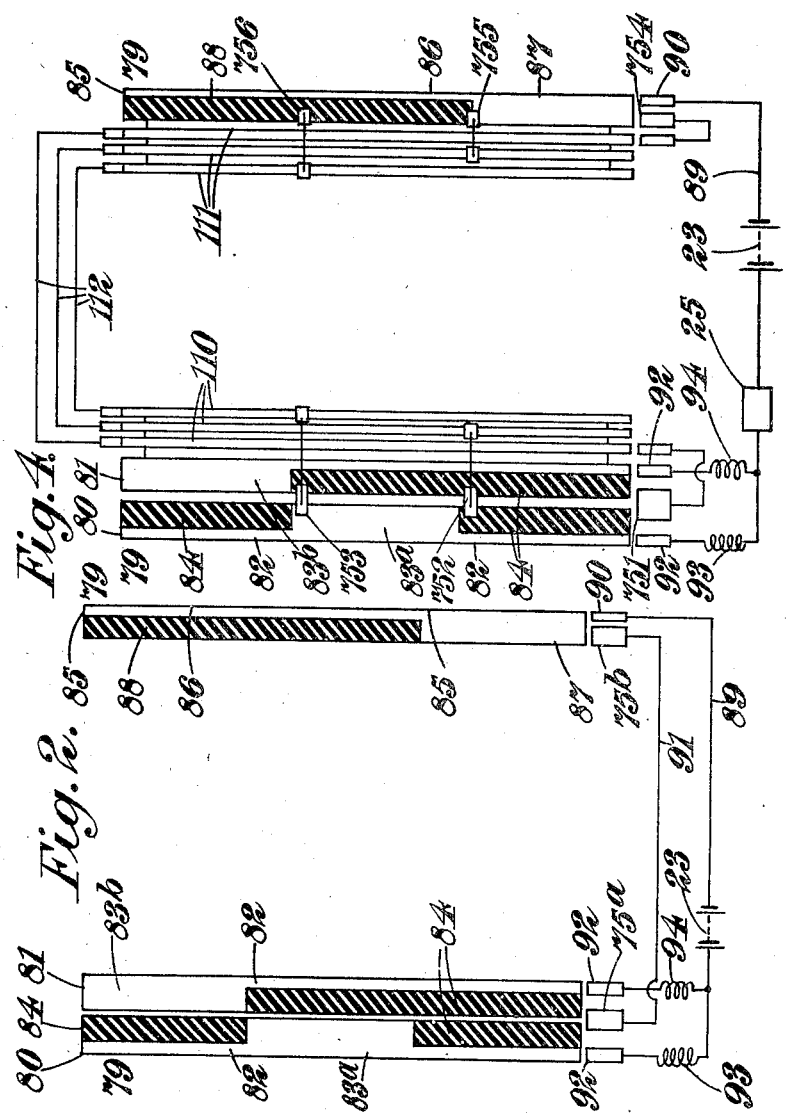
Figure 3:
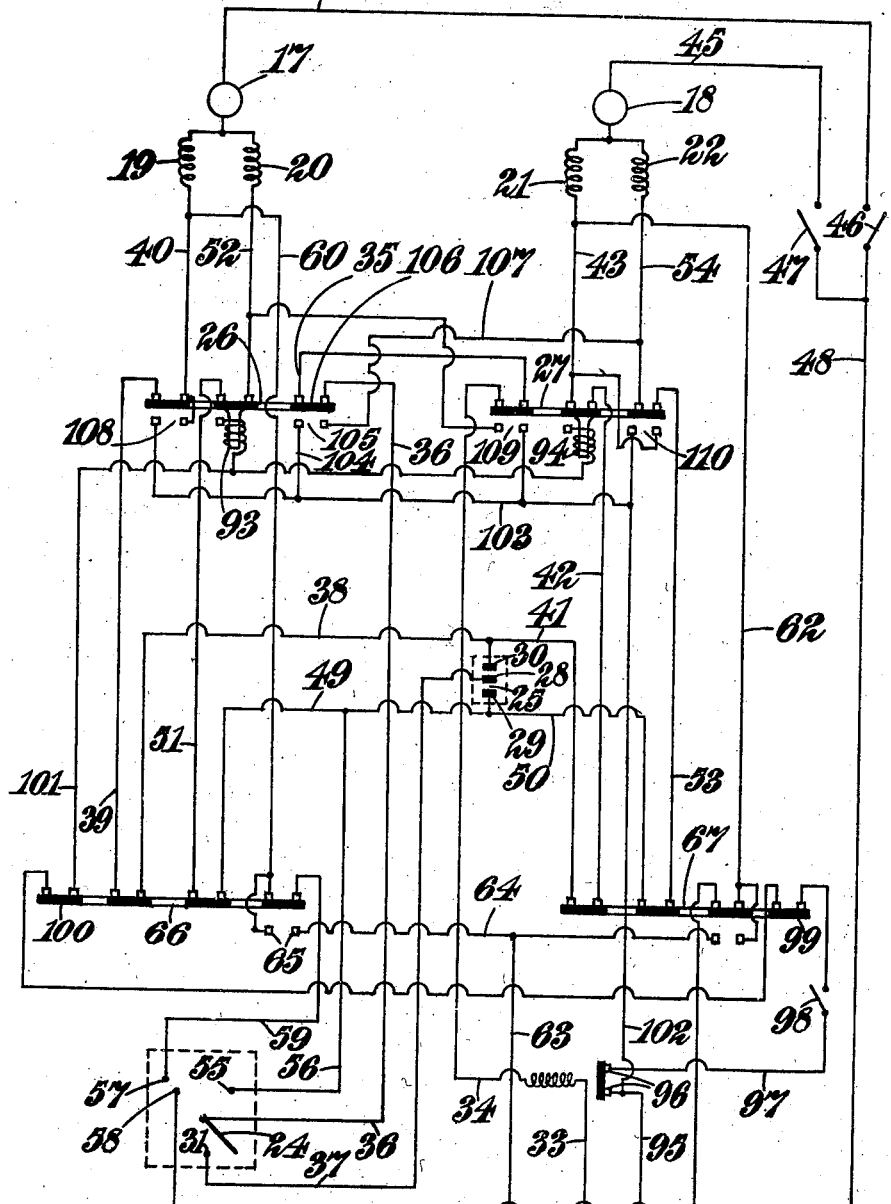

The invention will now be described with reference to the accompanying drawings which indicate diagrammatically various embodiments of this invention as applied to an installation comprising two airscrews driven from a single power plant and used in conjunction with a known form of constant-speed pitch control; in these drawings:

Figure 1 is a diagrammatic representation of a variable-pitch airscrew and its associated parts, Figure 2 is a developed diagram of an electrical bush and contacts system associated with the two airscrews, Figure 3 is a circuit diagram for one form of pitch-adjusting device, Figure 4 is a view similar to Figure 2 showing a modified form of brush system, Figure 5 is a circuit diagram of another form of pitch-adjusting device the use of which will be described in conjunction with the brush system shown in Figure 4, and Figure 6 is a circuit diagram combining the forms of pitch-adjustment shown in Figures 3 and 5.

Like reference characters indicate like parts throughout the drawings.

The invention is illustrated as applied to an electrically-operated variable-pitch airscrew, and, as shown in Figure 1, the hub 10 of the airscrew has mounted on it an electric motor 11 which drives through a suitable reduction gear 12, 13 the blades 14 to adjust their pitch. The airscrew is mounted on a hollow shaft 15 which carries a bevel gear 16 driven by suitable gearing from the power-plant.

As stated above, this invention is used in conjunction with a constant-speed pitch-control system and for convenience this will first be described briefly in the known form illustrated in Figure 3.

Referring to this figure, there are shown two pitch-changing motors for the port and starboard airscrews respectively, comprising armatures 17, 18 and double field windings 19, 20 and 21, 22 to give either direction of rotation according to which field-winding is energised.

These motors are energised from a battery 23 through a three-position manually-controlled switch 24, a governor-unit 25 and manually-operated multiple-contact feathering switches 66, 67.

The governor-unit 25 comprises a contact 28 which is governor-controlled according to the speed of the power plant to move between contacts 29, 30.

The operation of the control may now be briefly described as follows:

For constant-speed control, the three-position switch 24 is put on the automatic contact 31. If the speed of the power-plant is correct, the governor-contact 28 remains stationary in its mid-position. If, however, the speed rises, it is necessary to adjust both airscrews to a coarser pitch, and for this purpose the governor-contact 28 is caused to engage the contact 30. A circuit is thus provided from the battery 23, by the lines 32, 33, 34, 35, 36 to the switch 24. It will be noticed that the circuit is completed between the lines 34, 35 and 35, 36 through switches 26, 27 but these switches are concerned with the pitch-adjuster device of the present invention and will be described hereinafter. The circuit is completed from the switch 24 through the contact 31, line 37 to the governor-contact 28, contact 30 and thence to the two motors 17, 18, respectively, by the lines 38, 39, 40 to the field 19 and the armature 17, and by the lines 41, 42, 43 to the field 21 and the armature 18. From the other side of each of the motors connection is made by the lines 44, 45 through main switches 46, 47, respectively, back to the battery by line 48. With these circuits thus completed, both motors are driven to adjust the blades towards a coarser pitch and this continues until the increased loading brings down the engine-speed to the desired figure so that the governor-controlled contact 28 returns to its mid-position, breaking the circuit.

Similarly, if the speed of the power unit is too low, the blades of the two airscrews are simultaneously adjusted towards a finer pitch by the governor-contact 28 being brought into engagement with the contact 29. In this case the operative circuit is from the battery 23 to the contact 28 as previously, and then by the contact 29 to the two motors by the lines 49, 50, respectively. From the line 49 the circuit is taken through 51, 52 to the field-coil 20 of the armature 17 so that it runs in the opposite direction, and thence as before to the battery. Similarly, the motor for the starboard airscrew has its circuit completed from 50 by the lines 53, 54 and the field-coil 22 of the armature 18, and thence as before to the battery.

The governor-control may be rendered in-operative and a manual control substituted therefor by means of the switch 24. When this is set on the contact 55, the airscrews are adjusted towards the fine-pitch-setting, the circuit being completed from the battery 23 to the switch 24, as before, and thence by the contact 55 and the line 56 to the lines 49 and 50.

Similarly, for a manual adjustment towards a coarser pitch-setting, the manual switch 24 is set to engage the contacts 57, 58. The contact 57 is connected by the lines 59, 60 to the field-coil 19 and thence to the battery as before; similarly, the contact 58 is connected by the lines 61, 62 to the field-coil 21 and thence to the battery as before.

This known system of control also provides for feathering either airscrew, and this is effected by means of the multi-contact switches 66, 67. Assuming that it is desired to feather the port airscrew, the switch 66 is moved downward in the diagram, thereby opening all the control circuits previously described for the port airscrew, whether they happen to be in operation or not. The feathering operation is effected by a circuit completed from the battery 23 by the lines 32, 63, 64 to the pair of contacts 65 which are now closed by the switch 66 and thence by the line 60 and field-coil 19 to the armature 17 and thence back to the battery 23. The feathering switch is manually adjusted to the feathering position and the feathering continues until a suitable limit-switch opens the circuit on completion of the operation.

The feathering of the starboard airscrew by means of the motor 18, 21 is exactly similar and need not be described in detail.

The arrangements so far described comprise a known system of automatic and manual pitch-control and it will be appreciated that two switches, indicated generally by the references 26, 27 have not been considered since they are not moved in so far as the operations hitherto described are concerned. These switches are concerned with the adjustment of the pitch of the airscrews to the desired proportional relationship according to the present invention.

If the characteristics of the pitch-changing motors are fortuitously different one will change the pitch more quickly than the other; then on completion of each pitch-change the blades of one airscrew are in a finer-pitch position and the blades of the other in a coarser-pitch position than they should occupy.

The pitch-adjuster device now to be described is adapted to equalise the pitches of two airscrews and is such that when a pitch inequality occurs, the blades of both airscrews are moved in opposite directions to return them to an intermediate position of equal pitch. This adjustment is hereinafter referred to as "differential" adjustment or equalising.

Returning now to Figure 1, the bevel gear 12 which effects the pitch-adjustment of the blade 14 is mounted on a shaft 68 which extends through the hollow shaft 15. This shaft has fast on it a spur gear 69 which drives through a speed-increasing train 70, 71, 72 a shaft 73 which carries at its right hand end an arm 74 whereon is mounted an electrical brush 75. When any pitch-changing movement is effected, the rotation of the shaft 68 gives a bigger but proportional rotation to the shaft 73, so that the angular position of the brush 75, is a function of the pitch-setting of the blades 14.

A spur wheel 76 is rigidly mounted on the shaft 15, conveniently by a cage-like structure of which one part serves as a shaft for the compound gear 70, 71. A second gear wheel 77 of the same diameter as the wheel 76, but with a slightly different number of teeth, is mounted adjacent to it and they both mesh with an idler spur gear 78. On the shaft of the wheel 77 there is mounted a suitable structure, indicated generally by the reference 79, comprising slip rings and commutator-like spaced contacts which will hereinafter be described. The wheel 77 rotates at a slightly different speed from the airscrew determined by the number of teeth on the wheels 76, 77 respectively, and the member 79 is thereby traversed slowly with respect to the brush 75. It will be appreciated that all these parts rotate with the airscrew, but that the construction provides for a slow relative movement of the member 79 with respect to the brush 75 and for the angular adjustment of the brush 75 with any pitch-changing movement of the blades 14.

The port and starboard airscrews are both provided with all the parts illustrated in Figure 1 and with identical gearing.

The construction and arrangement of the sliprings and contacts comprising the member 79 differ for the two airscrews as shown in Figure 2.

For the port airscrew the member 79 is constituted by two discs 80, 81 each of which comprises a slip-ring 82 a contact 83a, 83b respectively extending one-third around the circumference of the disc and an insulating strip 84 extending around the rest of the circumference.

For the starboard airscrew the member 79 is constituted by one disc 85 of the same construction comprising slip-ring 86, contact 87, and insulating strip 88.

The brushes 75a, 75b of the port and starboard airscrews respectively engage their associated discs or disc across their contact and insulating portions only, and separate brushes 90, 92 engage the respective slip-rings as shown.

The two units are set-up so that when the airscrews have equal pitches the brushes 75a, 75b each bear the same angular position relatively to its member 79, and the contacts 83a, 83b, 87 are so spaced circumferentially that their positions correspond to the insulating strips of the other discs; that is, whilst the brush 75a bears on a contact-piece 83a or 83b, the brush 75b bears on insulating strip 88 and vice versa.

The three contacts 83a, 83b, 87 are arranged in a circuit with a battery (which will normally be the battery 23 of Figure 3) through line 89, brush 90, slip-ring 86, contact 87, brush 75b, line 91, brush 75a, one of the contacts 83a, or 83b, and one of the slip-rings 82 and brushes 92, and one of the solenoids 93, 94.

As stated above, when the airscrews have equal pitch the brushes 75a, 75b occupy the same relative positions and since the airscrews are rotating at the same speed the contacts 83a, 83b, and 87 will be traversed across their brushes at the same speed and the said circuit will remain open, since when the circuit is closed by one brush, 75a or 75b, it is opened by the other. If, however, a pitch-change takes place on one airscrew which is greater than on the other, a circuit will be completed during a revolution of the members 79 since its brush will be moved angularly relatively to the other brush so that the brush 75a is in engagement with one of the contacts 83a or 83b whilst the other brush 75b is also in engagement with its contact 87. The circuit will thus be completed through one or other of the solenoids 93, 94 to energise it, the solenoid selected depending upon which brush is in advance of the other. Since the contact-units are rotating relatively to their brushes, the solenoid will be intermittently energised, receiving one impulse for each revolution of the members 79, the duration of the impulse being proportional to the pitch difference between the blades of the airscrews; the maximum pitch-difference which arises will produce a displacement of brushes 75a, 75b which is slightly less than the length of one of the contacts. For example, if brush 75a is relatively in advance of brush 75b it will engage contact 83a and complete a circuit to solenoid 93 but will not reach contact 83b before brush 75b leaves contact 87; it is thereby ensured that only one of the solenoids is intermittently energised.

The two solenoids 93, 94 are used, respectively, when energised to operate the two switches 26, 27 of Figure 3. The circuit between these solenoids and the battery 23 as shown in Figure 3 is by lines 32, 95, the relay-controlled contacts 96, line 97, adjuster-main-switch 98 and thence through contacts 99, 100 on the two feathering switches 66, 67 and by line 101 to solenoids 93, 94. The terminals at the other end of the solenoids (left blank in Figure 3 to keep the diagram clear) are connected back to the battery through the brush and contact-unit circuit shown in Figure 2.

The operation of the pitch-adjuster will now be described assuming that a pitch-change has taken place and that whilst the preselected constant speed has been obtained a pitch inequality exists between the blades of the two airscrews. Since the preselected constant speed has been obtained the governor-contact 28 engages neither of its co-operating contacts 29, 30.

Because of the pitch-inequality one or other of the solenoids 93, 94 will be energised as above described. If, for example, the blades of the port airscrew have been moved more quickly and are in a finer-pitch position or if the blades of the starboard airscrew have been moved more quickly and are in a coarser-pitch position than they should occupy, the solenoid 93 is energised and the switch 26 in Figure 3 is moved downwardly. A circuit is then completed from the battery 23 by lines 32, 95, 102, 103, 104 to a pair of contacts 105 which are now closed by a contact-member 106 and thence by line 107, line 54, field coil 22, armature 18 and back to the battery so that the starboard airscrew is adjusted towards a finer pitch. Simultaneously, a circuit is completed from the line 103 through the contacts 108 and the line 40 to field coil 19 and armature 17 and thence back to the battery so that the port airscrew is adjusted to a coarser-pitch position. It will be appreciated, therefore, that both airscrews are simultaneously adjusted in the appropriate direction to bring them back to equality of pitch. This pitch-equalising movement is imparted to the brushes 75a, 75b and as soon as pitch-equality is reached, solenoid 93 is no longer energised and the switch 26 returns to its upper position as illustrated in Figure 3.

Similarly, if the difference of pitch between the two airscrews is in the opposite direction, the solenoid 94 is energised and switch 67 moved to its lower position. The port airscrew is thereupon adjusted to a finer-pitch position by a circuit through the contacts 109 whilst the starboard airscrew is adjusted to a coarser-pitch position by a circuit through the contacts 110.

Since the circuits for the solenoid are completed through the sets of contacts 83a, 83b and 87 of Figure 2, they are energised only intermittently whilst a difference of pitch exists between the airscrews, and the adjustment is therefore effected with an "inching" movement which ensures that there is no over-running with consequent hunting. Furthermore, it will be appreciated that since both airscrews are simultaneously adjusted towards pitch-equality the total loading on the engine will remain substantially constant so that the engine-speed remains unaffected by this operation.

It is important, however, that when the automatic speed-control, by means of the governor, is in operation it should not be interfered with by the pitch-equalising adjustment and it is for this purpose that the relay 96 above-mentioned is provided between the lines 95 and 97 of the equaliser circuit from the battery. This relay is energised by a solenoid in the line 33 which is in circuit with the governor-controlled contact 28 so that when any automatic governing action takes place by the latter completing a circuit with either of the contacts 29, 30, the solenoid aforesaid is energised and opens the relay contacts 96, thereby opening the pitch-equaliser circuit and preventing its operation so long as the governor is operative.

When the governor-switch is intermittent in its action (which may be especially provided for in a known manner by imparting a jogging movement to the governor-contacts) for the particular example illustrated, the two actions will proceed each intermittently, by the opening and closing of the relay contacts 96.

Another important feature of this invention is concerned with the provision for feathering either of the airscrews. It is essential that when such feathering is effected the pitch-adjuster becomes inoperative, and for this purpose the pitch-adjuster circuit from the battery, namely 32, 95, 96, 97, 98 is taken through the contacts 99, 100 on the feathering switches 67, 66, respectively, so that when either switch is set to its feathering position, said circuit is interrupted and so long as an airscrew remains in its feathered setting the circuit is maintained interrupted by this switch. The operation of either feathering switch entirely disconnects the normal governing operation from that airscrew but leaves the other one with its normal automatic control for speed, but the pitch-adjusting circuits of both airscrews are cut out because the question of pitch-adjusting does not arise with only one airscrew in operation in a twin-airscrew installation.

Furthermore, when the two airscrews are driven from a single power plant it will be necessary to de-clutch one airscrew during feathering and whilst it remains feathered, and for this purpose a special clutch may be provided together with an interconnection with the feathering switch so that de-clutching takes place automatically on the operation of the feathering switch.

To unfeather an airscrew the switch 66 or 67, as the case may be, is moved to its upper position and the pitch is changed under manual control, care being taken to ensure that until unfeathering has brought the pitch-inequality of the airscrews within the range of control of the adjuster, the circuit of the latter is not energised, but it can then be used to complete the operation of equalising.

The switches 46, 47 in the circuits respectively from the armatures back to the battery (which are preferably of a type embodying an overload cut-out to safeguard the electric circuits) enable either airscrew to be isolated whilst the other is controlled manually; this action might be necessary in the event of any failure of the pitch-equalising arrangements. These switches also enable all the controlling circuits for the airscrews to be switched off when not in use. The switch 98 in the pitch-equalising circuit also enables that circuit to be permanently interrupted should any fault develop therein, without interfering with the automatic governor-control.

In the brush-system described above the maximum pitch-inequality displaces the brushes relatively through an angle slightly less than that subtended by a contact (120°), to obtain the greatest period of equalising impulse during this condition. This impulse period extends during substantially one-third of a revolution of the members 79.

The impulse period may be increased threefold for any pitch inequality so that at maximum pitch inequality substantially continuous pitch-equalising takes place.

This extension to the impulse period may be produced by triplocating the members 79 and ensuring that an equalising impulse is successively sent out from each, the phase angle between the impulses being 120°. Alternatively the brush system may be triplicated. The latter arrangement will now be described with reference to a modified form of pitch-adjusting device, it being understood, however, that the multiple-brush system about to be described may replace the system already described.

The construction of the drive from the power plant to the airscrew and member 79, and from the airscrew-motor to the brush system is the same as described hereinbefore, as also is the general construction of the slip-rings and contacts comprising members 79.

Referring to Figure 4: the brush-carrying arm of the port airscrew carries three brushes 751, 752, 753 each independently connected to one of slip-rings 110, the brushes being 120° apart; the arm for the starboard airscrew also carries three brushes, 754, 755, 756, each independently connected to one of the slip-rings 111. Lines 116 connect one each of the slip-rings 110 to one each of the slip-rings 111.

The two units are set up so that when the airscrews have equal pitches the sets of brushes 751, 752, 753 and 754, 755, 756 each bear the same position relatively to the co-operating member 79 so that whilst any brush associated with the port airscrew bears on a contact piece 83 the corresponding brush of the starboard airscrew bears on insulating strip 88 and vice versa. Thus whilst the airscrews have equal pitch the circuit containing the solenoids 93, 94 and battery 23 remains open. When a pitch-change takes place and the pitch of one airscrew differs from the other its set of brushes is angularly displaced. The circuit will thus be completed through members 79, one or other of solenoids 93, 94 and the governor unit 25 to intermittently energise said solenoid whilst the governor is operating as will be fully explained hereinafter with reference to Figure 5. Three impulses are transmitted for every revolution of the members 79, one through every pair of corresponding brushes successively 751, 754; 752, 755; 753, 756 the duration of impulse being proportional to the pitch difference. For maximum controllable pitch-difference one set of brushes is angularly displaced by slightly less than the length of one contact; the possible duration of each impulse will therefore be just under one-third of a revolution of members 79 so that the circuit will be substantially permanently closed.

This arrangement of brushes and contact-units (omitting the governor-unit 25) illustrated in Figure 4 can be used, as mentioned above, in substitution for the arrangement shown in Figure 2 in the circuits shown in Figure 3, and operates similarly in that the pitch-correction is effected only whilst the governor-control is inoperative; it will be appreciated, however, that the pitch-correcting impulses are of longer duration in the case of a large pitch-difference than is obtained with the brush-arrangement shown in Figure 2.

In the arrangements so far described the pitch-correction is effected differentially by adjusting the pitches of the two airscrews towards one another, and such action takes place whilst the governor-control is inoperative; an alternative arrangement for pitch-correction is illustrated in Figure 5, the essential difference being that with this arrangement the pitch-correction takes place whilst the governor-control is operative and is effected by suitably controlling the relative speeds of the motors when they are energised through the governor-control.

Referring now to Figure 5, the battery 23, manual switch 24, governor-control 28, 29, 30, feathering switches 66 and 67 and motors 17, 18 are arranged similarly to Figure 3, but for the purpose of pitch-equalising, instead of the switches 26, 27, control-switches are inserted in the return leads 44 and 45 from the motors to the battery. The pitch-correcting devices are the same for both motors and that one for the port motor 17 will be described in detail. The isolating switch 46 as in Figure 3 is retained, but it is connected to a resistance 126 which is provided with relay-controlled contacts 121 which normally short-circuit it. A second pair of relay-controlled contacts 122 are also normally closed, but when the relay is energised the circuit from the motor can be opened at these contacts. A separate manually-controlled switch 125 is provided to short-circuit the whole of this device when required.

The relay contacts 121 and 122 are controlled by a pair of solenoids 93b and a second pair of solenoids 94b and provision is made in any convenient manner to introduce a time-lag in the operation of the relay 122, so that when the two coils 93b are simultaneously energised, the upper coil immediately opens the contacts 121 thereby introducing the resistance 126 into the motor circuit to slow it down. If this control-impulse continues beyond the time-lag aforesaid, the lower coil then operates the relay-contacts 122 to open them and thereby open the circuit of the motor 17 and cause it to stop. The two solenoids 94b are similarly arranged.

The coil of a relay 29a is connected in the line from the governor-contact 29 to operate a switch connecting the battery to the line 119 and thence to the coils 93b, and similarly the coils 94b are connected to the line 120 and thence to the battery by the relay 30a which is energised through the other governor-contact 30. The other ends of these coils are connected to lines 93c and 94c, respectively, which correspond to the lines 92 of Figure 2 or Figure 4, connected to the relay coils 93 and 94 in those figures.

A similar arrangement is provided for the starboard motor 18, but in this case the coils 94a are connected (in parallel with the coils 93b) to the battery on one side by the relay 29a and on the other side to the line 94c, whilst the coils 93a are connected between the relay 30a and the line 93c.

In general terms the operation of this arrangement is that when the governor-control is operative to adjust both airscrews towards, say, a coarser-pitch position, and due to fortuitous different motor-characteristics, one airscrew tends to take up a coarser pitch than the other, this tendency is detected by the brush-system of Figure 2 or Figure 4 and the device operates to slow down or stop the motor which would give a coarser-pitch position to its airscrew. Similarly, if they are being adjusted towards a finer pitch the motor which tends to give too great a movement to its blades is slowed down or stopped.

By way of example, let it be assumed that the two airscrews are both to be adjusted towards coarser pitch and that the port airscrew tends to move too far or too rapidly.

As soon as the governor operates to cause adjustment of both airscrews towards coarser pitch, the contacts 28, 30 are closed and the battery positive is connected through the line 36, switch 24, contact 31, line 37, contacts 28, 30 to the two motors to energise both of them. Since the port airscrew moves more rapidly during this pitch adjustment a pitch difference results which is detected by the brush-device. Simultaneously the relay 30a is operated and the battery potential applied through the line 120 to the coils 94b from which the circuit is completed through the line 94c and the brush system so that these coils are energised and one or both of the relays 121, 122 is operated in a manner above-described to slow down or stop the motor 17. Therefore, the starboard airscrew-blades will be adjusted towards their coarse pitch position at a higher speed than the blades of the port airscrew, so that the pitches will ultimately be equalised, and at this point the circuit of the line 94c will be broken so that no further pitch-equalisation takes place until another difference arises.

It will be seen that four conditions of operation have to be provided for, (1) when adjusting towards coarse-pitch position either one of the motors may have to be retarded and (2) when adjusting towards fine-pitch position either one of the motors may have to be retarded, and it is for this reason that two pairs of coils 93a, 94a and 93b, 94b have to be provided for each relay 121 and 122. It will be seen, however, that the energising of one pair of the coils as above described also energises the other three pairs of coils. Thus, in the example given above, when the coil 94b is energised, there is also completed a circuit from the line 120 through the coils 93a, 93b and 94a to the line 94c (the line 93c being open); since these three coils are in series across the battery the current will be substantially only one-third of that through the coil 94b. The coils 93a and 94a are, therefore, wound with an opposite handing as are the coils 93b, 94b, and it will be seen that with this arrangement the coils 93a and 94a oppose one another whilst the coil 93b reinforces the magnetic field of the coil 94b so that the resultant effect is the same as if only the coil 94b were energized and the operation of these relays can be dealt with on that basis.

The operation for the various other combinations need not be described in detail since it is similar to that already described.

Feathering of either airscrew is effected by the feathering switches 66, 67 as already described.

In a pitch-adjusting device having one brush 75 as in Figures 1 and 2, the rate of traverse of the member 79 with respect to the brush in part decides the maximum controllable value of pitch-deviation, but in a pitch-adjusting device having a triple-brush system as in Figure 4, the maximum value is independent of said rate of traverse so that changes in the latter would not affect the maximum value. Accordingly, in a pitch-adjusting device having a triple-brush system, instead of continuously driving the member 79 from the power plant, the members 79 may be housed in the airscrew-hub and driven through suitable gearing from the pitch-change motor. The brushes are then secured to the airscrew-hub, suitable provision for conducting current to and from the brushes being made through slip-rings mounted on the airscrew-shaft. Since the speed of rotation of each member 79 is proportional to the speed of its driving pitch-change motor, variations in the speed of one motor with respect to another, due to fortuitous different motor characteristics produce relative displacement of the contacts of one member 79 with respect to the other thereby completing the pitch-adjusting circuit through the contacts and brushes. The gearing between the member 79 and the pitch-change motor is selected to produce either equality of pitches or a predetermined pitch relationship other than equality. In the latter case the pitches of the blades of the airscrews are initially set as hereinafter described.

The two forms of operation above described may be combined so that whilst the governor is inoperative equalising is effected differentially, and whilst the governor is operative equalising is effected by stopping the pitch-change motor producing the inequality. The circuit which enables this combined control to be effected is shown in Figure 6.

The battery 23, manual switch 24, governor-control 28, 29, 30, feathering switches 66 and 67 and motors 17, 18 are arranged similarly to Figures 3 and 5. The pitch-correcting devices are the same for both motors and those for the port motor 17 will be described in detail.

The current supply lines 40, 52 for motor 17 are each provided with contacts 150, 151 which are normally open but are relay-controlled to the closed position.

The opening and closing of each pair of contacts 150 and 151 is accomplished by three solenoids 152, 153, 154 and 155, 156, 157, respectively. In each set of three solenoids one (154, 157) is connected in series with one of the fixed contacts 30, 29 respectively of the governor-unit 25 by lines 59, 56, respectively and (through the feathering switch) by lines 170, 48, battery 23, lines 32, 33, 34, contact 31 and governor-contact 28. These solenoids are selectively energised by closing of the governor-contacts and thereby close the contacts 150 or 151 during governing to effect pitch-change and are referred to as the "governor" solenoids.

Another of the set of three solenoids (152, 155) is connected in series with the brush system by lines 33, 32, battery 23, lines 48, 170, feathering switch 66, 168, 89, through the brush system to 94c or 93c, respectively (each of the latter leading to one of brushes 92 as in the previous constructions). The function of these solenoids is to neutralise the effect of solenoids 154, 157 respectively during pitch-change of the airscrews when a pitch inequality is introduced by motor 17 so that the contacts 150, 151 which have been closed by solenoids 154 or 157 to set the motor in operation will return to their normal open position and stop the motor. The solenids are, therefore, described as "stopping" solenoids. Thus, if the governor-unit energised solenoid 154 to close contacts 150 and bring into operation the pitch-change motor to set the airscrew-blades in a coarser pitch and motor 17 produces a pitch inequality then the brush system will transmit energising impulses to solenoid 152 to neutralise the effect of solenoid 154 and return contacts 150 to their normal open position. The motor 17 is thereby prevented from operating (although the motor 18 is running) until the pitch inequality is removed. Similarly, if solenoid 157 is energised, and the motor 17, whilst setting the airscrew-blades in a finer pitch, produces a pitch inequality, solenoid 155 is energised and contacts 151 return to their normal open position and the motor is stopped.

Finally, in each of three solenoids another (153, 156) is connected in series with the brush system by lines 169, relay-controlled contacts 96, lines 33, 32, battery 23, lines 48, 170, 168 and 89 and by lines 94c, 93c, respectively. The solenoids are adapted to selectively close the contacts 150 or 151 whilst the governor-unit is inoperative, if and when a pitch inequality is produced; the motors 17 and 18 are thereby started so that the pitches are equalised differentially as described with reference to Figure 3. These solenoids are referred to as the "differential" solenoids.

It will be seen from Figures 6 that the circuit described above is duplicated for motor 18, the lines 43, 54 of which have relay-controlled contacts 160, 161; each pair of which is operated by a set of three solenoids 162, 163, 164 and 165, 166, 167, respectively, in the same manner as described for motor 17.

The two pairs of stopping solenoids 152, 165 and 155, 162 are connected in parallel between line 33 (which is connected to the battery 23 by line 32) and lines 93c and 94c, respectively, which through the brush system and lines 89, 168, 170 and 48 return to the battery 23. The two pairs of differential solenoids 153, 166 and 156, 163 are likewise connected in parallel between line 169 and lines 94c, 93c, respectively, and the two pairs of governor solenoids 154, 164, and 157, 167 are connected in parallel respectively between lines 59, 56 and line 48.

Line 169 is connected to the battery through a pair of contacts 96 and line 33, 32, the opening of the contacts being effected by a relay placed in series with the battery 23 and the manual switch 24. Thus, whilst a circuit is completed through the manual switch 24 to the governor solenoids the relay will be energised to open contacts 96 and prevent the differential solenoids being energised.

The operation of the apparatus is as follows:

For pitch-changing the governor-unit 25 comes into operation; assuming that the contact 28 thereof engages contact 30 to set the airscrew-blades in a coarser pitch, a circuit will be completed from the battery 23 by lines 32, 33, 34 (thereby energising the relay to open contacts 96) manual switch 24, contact 31, line 59 and so to governor solenoids 154, 164 and by line 48 back to the battery. Solenoids 154, 164 close contacts 150, 160 and motors 17, 18 are placed in circuit to effect the required pitch change.

During this the differential solenoids are inoperative as contacts 96 are open but if a pitch inequality occurs angular displacement of the brushes of the brush system ensures a transmission of a series of impulses to the stopping solenoids.

If during the governing action the starboard airscrew is being set to a coarser pitch than the port airscrew the impulses will be transmitted to the stopping solenoid 162 and contacts 160 will be opened since the stopping solenoid will neutralise the effect of the governor solenoid and the relay-controlled contacts are spring-urged to this position. Pitch-equalising is thus effected during governing.

Similarly, if the governing action is to set the airscrews in a finer pitch and whilst this is taking place one of the airscrews is being set to a finer pitch than the other, the stopping solenoid of the airscrew which is producing the inequality will be energised to stop its motor and effect equalising.

Whilst the governor is inoperative, contacts 96 are closed as their relay is not energised and an angular displacement of the brushes produced by a pitch-inequality ensures transmission of a series of impulses to the appropriate differential solenoids of each airscrew which thereupon close their relay-controlled contacts 150, 161, or 151, 160 and equalise the pitch of the airscrew-blades differentially. This function has been fully described with reference to Figure 3 and need not, therefore, be further elaborated.

As in the previous construction, feathering switches 66, 67 are provided.

In certain installations it is desired to provide means for setting the airscrew-blades so that the pitches thereof are not equal but bear a predetermined relationship throughout the range of pitch-adjustment.

For this purpose the gearing 69—72 (Figure 1) of one airscrew has a different ratio from the gearing of the other airscrew. The airscrews are set up so that the blades thereof have a pre-selected pitch-difference at one end of the range of pitch-adjustment (say the fine-pitch position) and for this position the brush or brushes associated with the airscrews are in the same position relatively to their co-operating members 79.

The apparatus operates as before, but during pitch-changing, however, due to the gearing being different for the two airscrews, the brushes 75 will be compulsorily displaced. The pitch-adjusting mechanism will come into play to displace the airscrew-blades and return the brushes 75 until they occupy a place mid-way between their relatively displaced positions. This blade-displacement will be different for each airscrew for in order that each brush shall move the same amount the blades of one airscrew must move through an angle which is greater or less than that moved through by the other in the same ratio as exists between the two sets of gearing.

The predetermined relationship is maintained between the pitches of the airscrew-blades over the whole range of pitch-variation.

Instead of modifying the gearing 69—72, this may be the same for each airscrew and the desired ratio may be obtained by using different bevel gears 12, 13 in the two airscrews.

It may be more satisfactory in co-axial counter-rotating airscrew and tandem-airscrew installations to maintain the pitches equal throughout the range of pitch-variation and have one airscrew rotate at a different speed from the other. This may be done by providing a different fixed-ratio airscrew reduction gear between each airscrew and the power plant, with pitch-adjusting means of any of the forms described.

In installations having more than two airscrews driven from a common power plant, pitch-adjustment may be effected for example by the arrangement above described which retards or stops the pitch-change motors which rotate the faster. The rate of pitch-change is governed by the airscrew having the lowest rate of pitch-change so that the latter becomes a master and the others slaves. It will be understood that in one pitch-changing operation one airscrew may be the master and in another pitch-changing operation another airscrew may become the master.

In such installations one of the airscrews has a single-disc member 79 provided in its pitch-adjusting device and the other airscrews each have a two-disc member 79. The latter are all set up in the relationship to the single disc-member 79 which has been indicated hereinbefore and the brushes of the two-disc pitch-adjusting devices are each connected in series with the brush or brushes of the single-disc pitch adjusting device.

Angular displacement between the brushes of the master and any slave device brings into operation the two solenoids associated with the slave device to retard or stop one of the pitch-change motors as already described. Displacement of the brushes of the slave devices in different senses and/or to different degrees will refer each inequality to the master device whereupon the required adjustment will be effected.

In hydraulically operated variable-pitch airscrews the motors thereof which change the pitch may (as in the case of electrically operated variable-pitch airscrews) have different characteristics and produce pitch-inequalities; thus one hydraulic motor may be more sluggish than the other and consequently when a pitch-change takes place a pitch-inequality will be introduced. Alternatively it may be desired to maintain the pitches of the airscrew-blades in a predetermined ratio. The provision of a brush system in accordance with the present invention would detect or produce pitch adjustments and would be adapted to bring into operation the required adjusting circuit. Completion of the circuit operates means which, for instance, would superimpose a control on the governor to vary the rate of fluid supply to the hydraulic motors, thereby producing the required relationship between the pitches.

We claim:

1. In an airplane, a plurality of propellers, motors to drive said propellers said motors interconnected to rotate in a predetermined speed relationship, power means for independently adjusting the pitches of the propeller blades, a governor responsive to motor speed variation, a circuit including said governor and power means and closable by said governor to automatically operate the power means to adjust the pitches of the propellers to give preselected constant speed, pitch-ratio-correction means, a circuit for said pitch-ratio-correction means including said power means, a switch in the governor-controlled circuit, and means in the pitch-ratio-correction circuit for opening said switch when the pitch-ratio-correction circuit is closed by said pitch-ratio-correction means.

2. In an airplane, a plurality of propellers inter-connected to rotate in a predetermined speed relationship, motors to drive said propellers, power means coupled to vary the pitches of said plurality of propellers, an automatic governor responsive to engine speed, a circuit connecting said governor and said power means whereby the governor controls the operation of said power means, pitch-ratio-correction means, a circuit connecting said pitch-ratio-correction means with said power means, and a manually-operated feathering switch for each propeller constructed and arranged and coupled in said circuits to override both the governor-control and the pitch-ratio-correction means.

3. In combination, a plurality of variable-pitch airscrews, and means for detecting changes in the pitch of one airscrew relatively to another comprising, for each airscrew, an electric switch-device opened and closed periodically, means connecting each switch with the blades of its airscrew so that the datum-timing of its operating cycle is determined by the pitch-setting of the blades, said means being so constructed and arranged that when the pitches of the airscrews are equal their switches are operated in opposite phase, but on an alteration of the datum-timing, the closed periods of two switches overlap.

4. In an airplane, a plurality of airscrews having adjustable blades, a motor for driving all said airscrews so as to rotate in a predetermined speed relationship, reversible motors connected to effect pitch changes in the airscrews, a governor, governor-controlled means connected to govern the operation of said motors, and pitch-ratio-correction means comprising a rotary switch driven by each airscrew and comprising relatively movable parts set to circuit open position when the ratio between the airscrew pitches is normal, means coupled to the airscrews and movable with pitch changes to cause relative movement of said parts of said rotary switches to cause said parts to move to circuit closing position when inequalities occur in said pitch ratio, and a circuit including the rotary switches of all the airscrews and also including said electric motors.

5. The combination as claimed in claim 4, further comprising a speed-reducing gear connecting each airscrew to a rotary part of its rotary switch.

6. The combination as claimed in claim 4, in which one of the parts of each rotary switch is a brush and one part a rotary drum having insulated and contact segments wiped by said brush, a speed-reducing gear connecting each airscrew to the drum of its rotary brush, and a speed-increasing gear connecting the blades of an airscrew to the brush of its rotary switch.

7. In a mechanism according to claim 4, in which the switches are intermittently operated and the brushes are fixed on the airscrew-hub.

8. In an airplane, a plurality of propellers interconnected to rotate in a predetermined speed relationship, motors to drive said propellers, power means for independently adjusting the pitches of the propeller blades, a single governor responsive to motor speed variation, a governor-controlled circuit connecting said governor with the power means and closed by said governor to automatically operate the power means to adjust the pitches of the propellers to give preselected constant speed, pitch-ratio-correction means, a circuit for said pitch-ratio-correction means including said power means, a normally-open switch in said pitch-ratio-correction circuit, and a solenoid in said governor-controlled circuit in operative relation to said switch to close the switch when the solenoid is energized.

9. The combination of claim 8 further characterized by the fact that the pitch-ratio-correction means is so constructed and arranged and so coupled to said power means as to pitch adjust the companion propellers simultaneously and in opposite directions toward pitch-ratio equality.

FREDERICK METCALF THOMAS.
PETER RALPH PRICE.